No. 892,460.

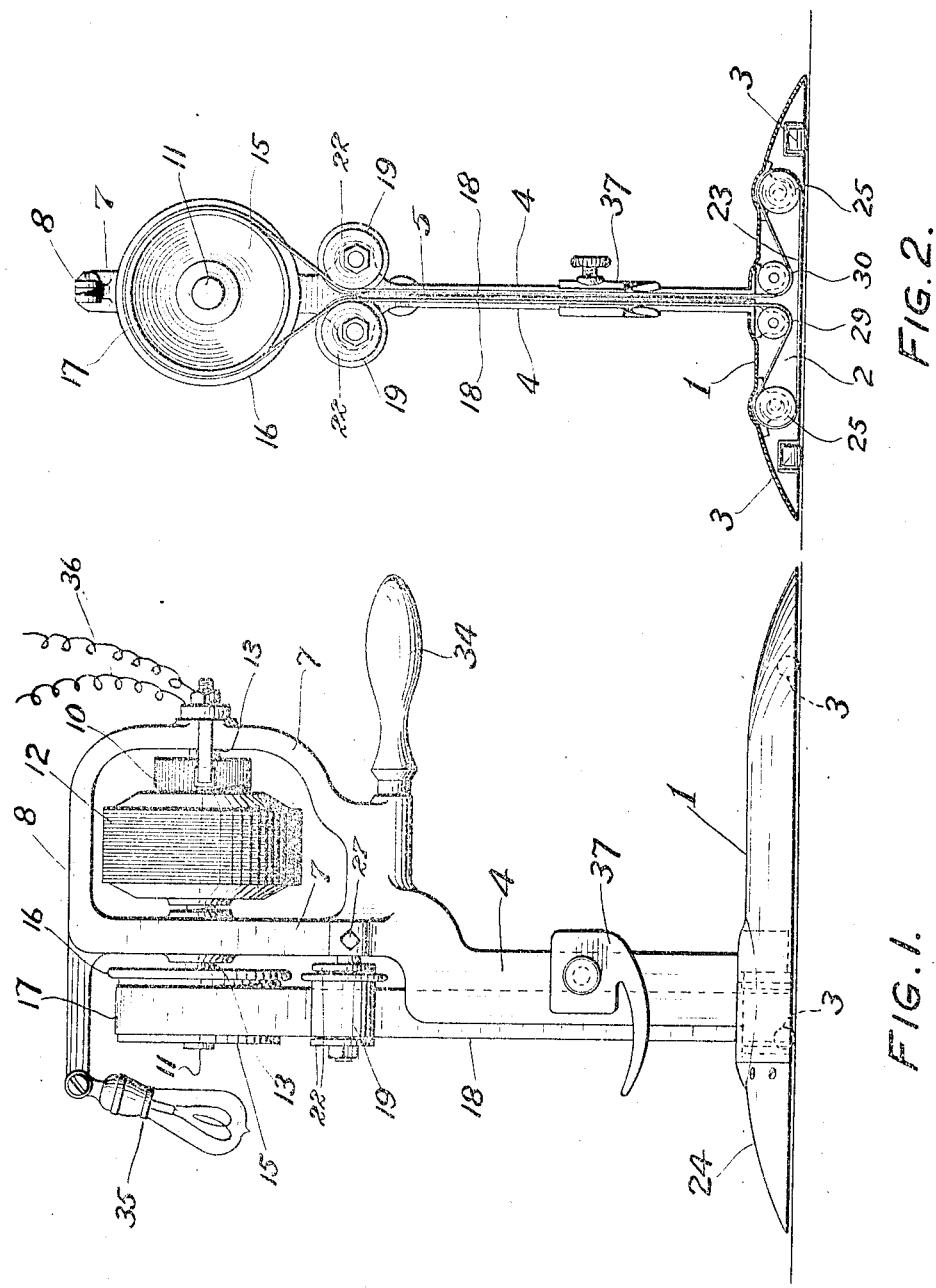

PATENTED JULY 7, 1908.

A. SPIELMAN.
CLOTH CUTTING MACHINE.
APPLICATION FILED NOV. 13, 1907.

2 SHEETS—SHEET 2.

WITNESSES:
Elizabeth Mayr
M. G. Egan

INVENTOR
Adolph Spielman
BY
William B. Jackson
ATTORNEY.

UNITED STATES PATENT OFFICE.

ADOLPH SPIELMAN, OF PHILADELPHIA, PENNSYLVANIA.

CLOTH-CUTTING MACHINE.

No. 892,460.   Specification of Letters Patent.   Patented July 7, 1908.

Application filed November 13, 1907. Serial No. 401,910.

*To all whom it may concern:*

Be it known that I, ADOLPH SPIELMAN, a citizen of the United States, residing at Philadelphia, in the county of Philadelphia and State of Pennsylvania, have invented certain new and useful Improvements in Cloth-Cutting Machines, of which the following is a specification.

This invention relates to devices of that class used for cutting cloth or other textiles in the manufacturing of clothing and other goods or fabrics, and has for its principal object to provide a machine of this character of a simple and inexpensive nature, and of a strong, compact, and durable construction that is not liable to become deranged or broken in use.

A further object is to provide a machine of this character having cutting devices of an improved and novel character adapted to permit of cutting materials in any desired direction in a true and accurate manner.

A still further object is to provide an endless cutting band having its runs adapted to move in opposite directions, and having means for causing one of the runs of said endless knife to pass backward and out of alinement with the opposite portion of the knife when cutting.

A still further object of the invention is to provide certain novel features of construction and combinations of parts of the cloth cutter.

Other objects will appear hereinafter.

The invention consists of the improvements hereinafter described and finally claimed.

Figure 3:
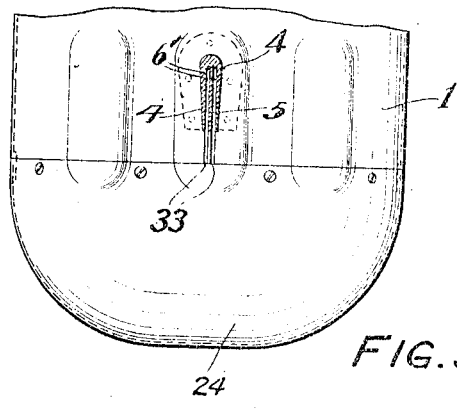
Figure 4:
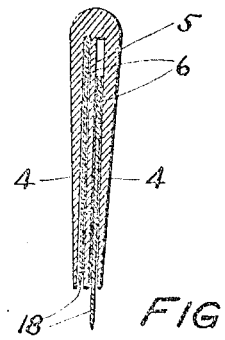
Figure 5:
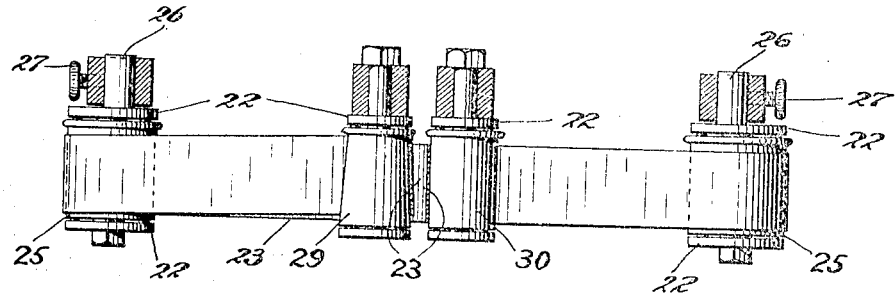
Figure 6:
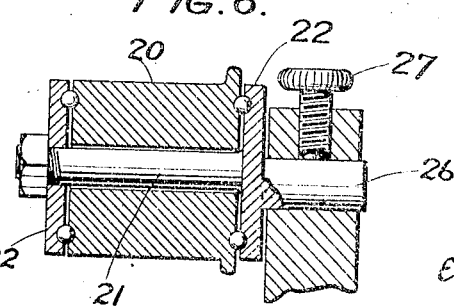

The nature, characteristic features, and scope of the invention will be more fully understood from the following description taken in connection with the accompanying drawings forming part hereof, and in which Figure 1, is a side elevational view of a cloth cutting machine embodying the invention. Fig. 2, is a front elevational view of the same, partly in section. Fig. 3, is a fragmentary view in plan of the base plate. Fig. 4, is a view in cross section of the standard of the machine, and illustrating the two runs of the endless knife in their relative positions. Fig. 5, is a plan view partly in section of rollers and sheaves beneath the base plate. Fig. 6, is a sectional view of one of the ball bearing rollers, and Figs. 7, and 8, are views of endless knives hereinafter referred to.

Referring to the drawings, the improved cutting machine comprises a base plate 1, provided on its under side with a chamber 2, adapted to house certain devices hereinafter referred to. The base plate is of generally rectangular form, and has its side walls inclined downwardly so as to permit the base to be readily slipped beneath the cloth to be cut. The base plate 1, is provided with wheels or rollers 3, the peripheries of which extend slightly below the underside of the inclined walls of the base plate. Rising from the base plate 1, is a somewhat M-shaped standard which comprises side walls 4, and a central partition 5, which thus forms a pair of channels 6, the object of which will be hereinafter described. This standard carries a motor supporting frame, comprising a pair of upright arms 7, terminating in a horizontal extension 8. Mounted between these arms is a motor which may be of any ordinary construction, and comprises an armature 10, held upon a shaft 11, and a field 12.

The ends of the armature shaft are journaled as indicated at 15, in the upright arms 7, of the before described frame. Keyed to the forward end of the armature shaft 11, is a main driving wheel 15, over which is adapted to pass the upper bight 17, of an endless cutting band or knife. The wheel has a flange 16, at its rear side to prevent the cutting band from slipping back against the frame during the operation of the machine. Below the driving wheel the two runs 18, of the cutting band are carried down toward each other and between idler-sheaves 19. The idler-sheaves are carried by one of the arms 7, of the standard and as shown comprise rollers 20 which are held to turn loosely on studs 21 carried between plates 22, ball bearings being present to facilitate the movement of the roller. The roller as a whole is provided with an eccentric pin 26, whereby the rollers may be caused to advance toward or away from each other and secured by the thumb nut 27. Below the said sheaves the two runs of the cutting band are extended downward in parallelism and closely adjacent to each other through the aforesaid channels 6, of the standard, the said runs being separated by the partition 5. In the base plate of the machine there are slots 33, which afford access to the hollow chamber, in order that the lower bight 23, of the endless knife may be inserted. Access may be had to this slot by removing the front piece 24, of the base plate. In the chamber 2, of the base plate 1, are arranged a plurality of wheels or rollers 25, constructed as the above described idler-sheaves and adapted to receive the lower bight of the endless knife and there are also other wheels or idler-sheaves 29 and 30, spaced apart to receive between them the two runs of the cutting band. One of these idler-sheaves, shown as 29, is beveled, as illustrated, in order to throw the upward moving run of the cutting band backward out of alinement with the cutting edge of the opposite run and cause it to pass entirely within one of the channels 6, of the standard. Thus the downward moving run of the knife cuts the work presented, which obviously is advantageous. The rollers of the said sheaves are of the ball bearing variety, but are not arranged eccentrically.

Figure 7:
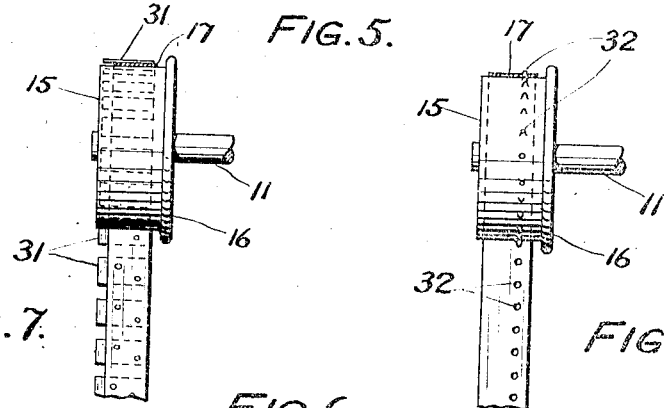
Figure 8:
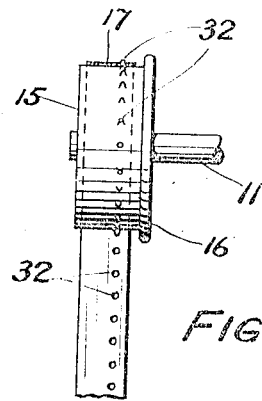

The endless knife may be perfectly plain, as shown in Fig. 1, or may be perforated at 32, as shown in Fig. 8, or may be of leather, or similar flexible material, as shown in Fig. 7, and provided with a series of short knife sections 31, riveted thereon. In the case of using the perforated band, the main driving pulley 15, is equipped with projections 32, that engage the perforations and serve to cause the endless knife to move steadily. In applying the cutting band to the machine, the front piece 24, is removed and the lower bight of the endless knife is passed through the slots 33, within the chamber 2, and passed around the several rollers and idler-sheaves, and the upper bight of the endless band is then passed over the main driving wheel, the two runs of the band being passed through the channeled standard and between the idler-sheaves 19, whereupon the band may be drawn to the desired tension by means of the eccentrically arranged rollers 25, and idler-sheaves 19, and the front plate adjusted to place.

The machine may be equipped with a handle 34, and with an incandescent light 35, shown as being carried by the horizontal portion 8, of the motor frame.

The motor may be connected with a source of supply by means of the conductors 36.

37, is a presser foot that may be adjustably mounted upon the standard of the machine as shown.

What I claim is:

1. In a machine of the class described the combination of an endless band having a continuous cutting edge, means for causing the opposite sides or runs of said band to travel endwise in reverse directions at the point of presentation of the work to be done, and means for causing the cutting edge of one of the sides or runs of said band to pass rearward and backward out of alinement with the cutting edge of the opposite side at the said point where presented to the work.

2. In a machine of the class described the combination of a standard provided with channels arranged in parallelism having a partition therebetween, an endless band having a continuous cutting edge the opposite sides or runs of which are adapted for endwise travel through said channels in reverse directions, means for operating and guiding said band, and means for causing the cutting edge of one of the sides or runs of said band to pass rearward and backward out of alinement with the cutting edge of the opposite side at the point where presented to the work to be done.

3. In a machine of the class described the combination of a base plate, a standard having partitioned channels rising therefrom, an endless cutting band the runs of which are adapted for endwise passage through said channels, a driving wheel carried by the upper end of said standard and adapted to receive the upper bight of the endless cutting band, a plurality of rollers beneath the base plate adapted to receive the lower bight of said cutting band, eccentric means for moving said rollers toward or away from each other, idler-sheaves carried by the standard and arranged to guide the band to the said channels, and eccentric means for causing the said rollers and sheaves to advance toward or away from each other.

4. In a cutting machine the combination of a base plate, an endless cutting band having a bight below the base plate, a pair of sheaves for the said bight, and a pair of idler-sheaves arranged to bear on the two runs of said cutting band, whereof one of said idler-sheaves is inclined to throw the cutting edge of the band rearward and out of alinement with the cutting edge of the opposite run where presented to the work.

In testimony whereof I have hereunto signed my name.

ADOLPH SPIELMAN.

Witnesses:
W. J. JACKSON,
CLIFFORD K. CASSEL.